Figure 1:
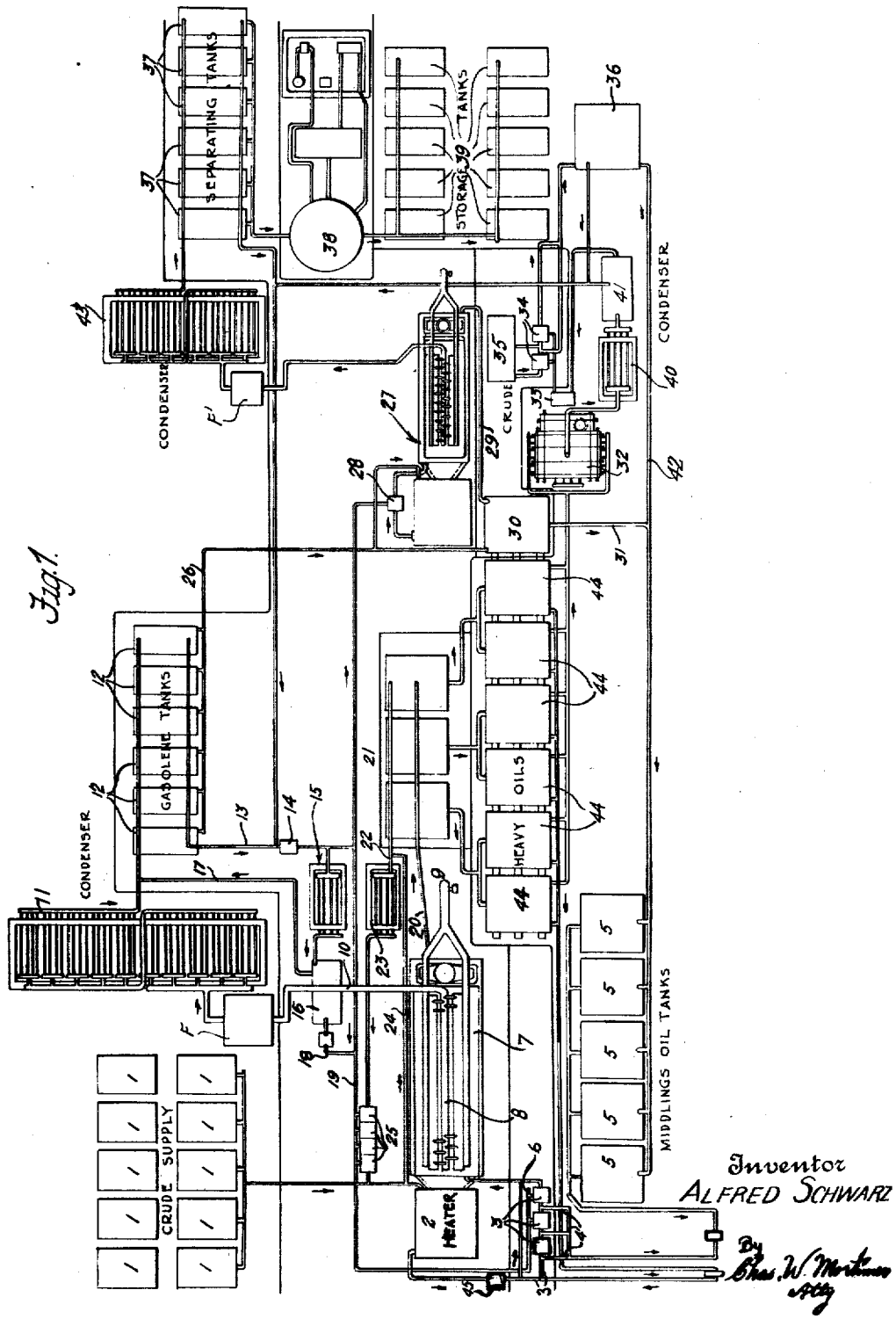

June 12, 1923.

A. SCHWARZ 1,458,443

PROCESS OF TREATING HYDROCARBONS

Filed Feb. 13, 1923

8 Sheets-Sheet 1

Inventor
ALFRED SCHWARZ

By Chas. W. Mortimer
Atty

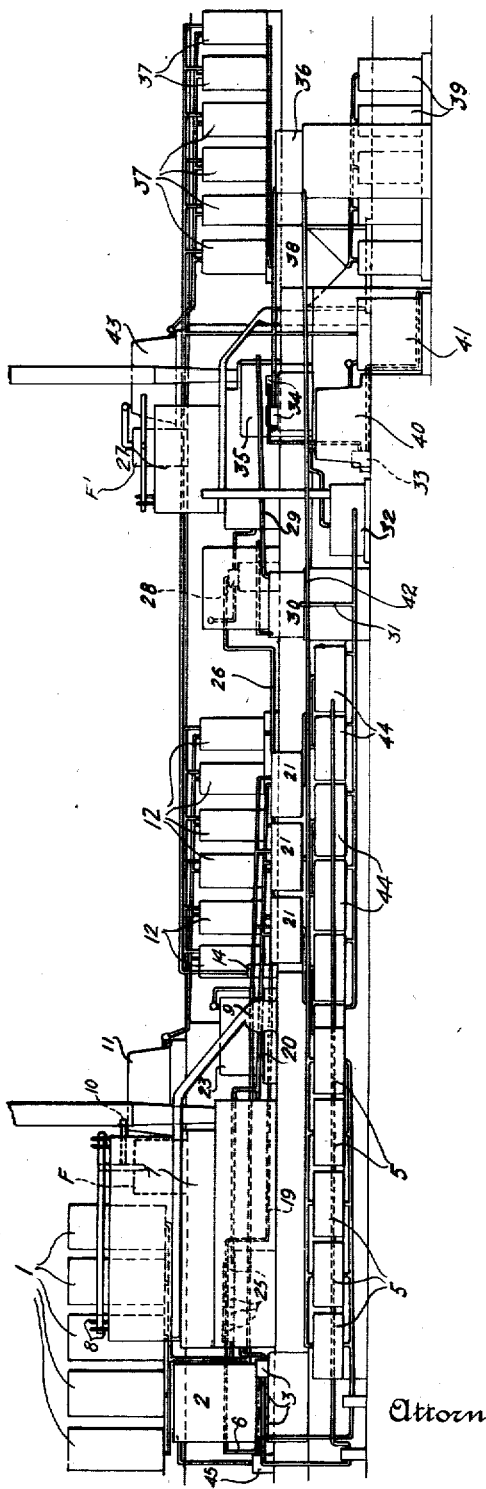

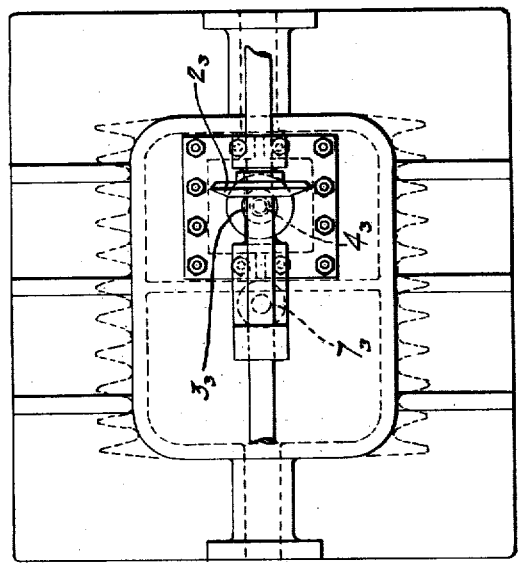
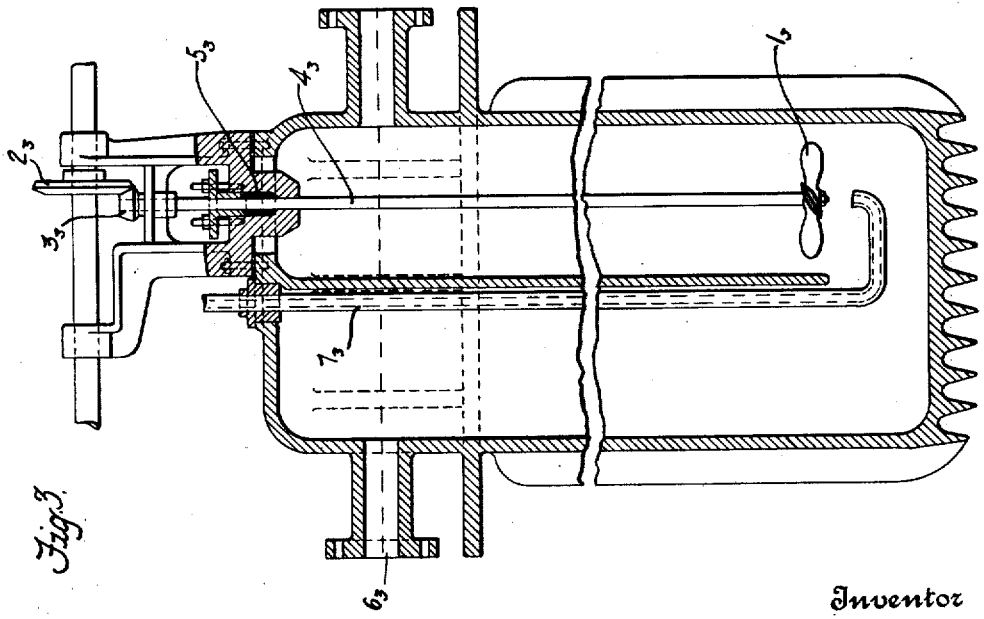

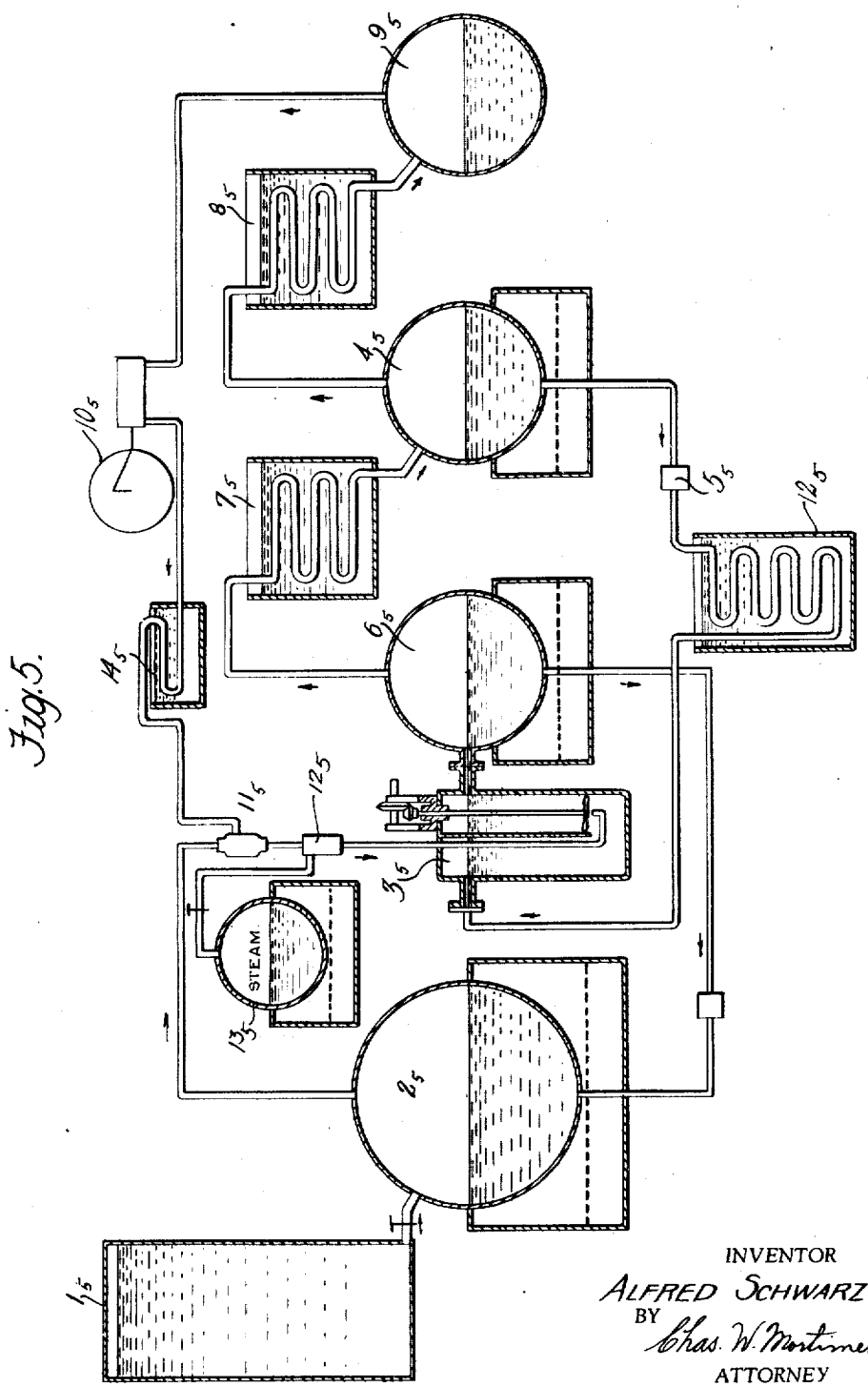

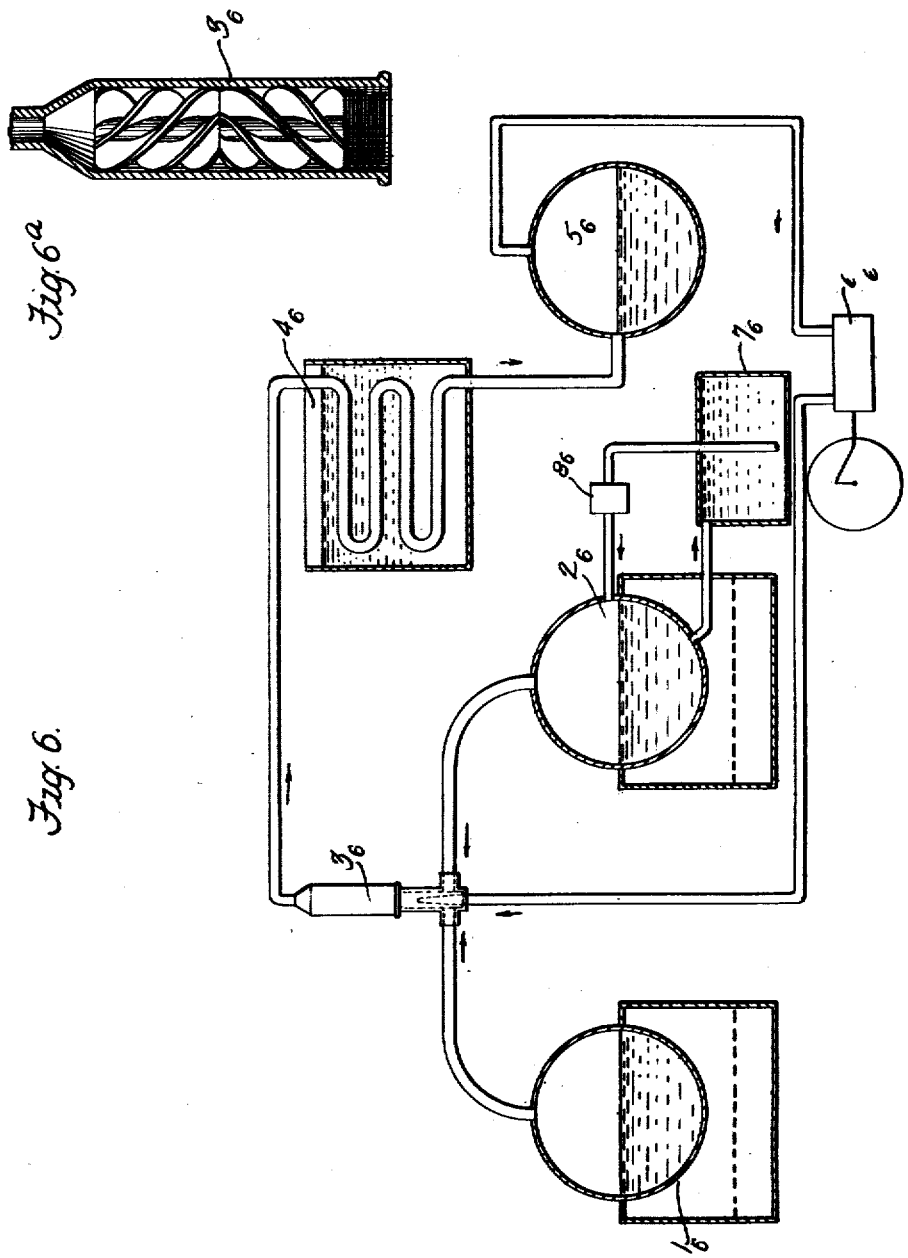

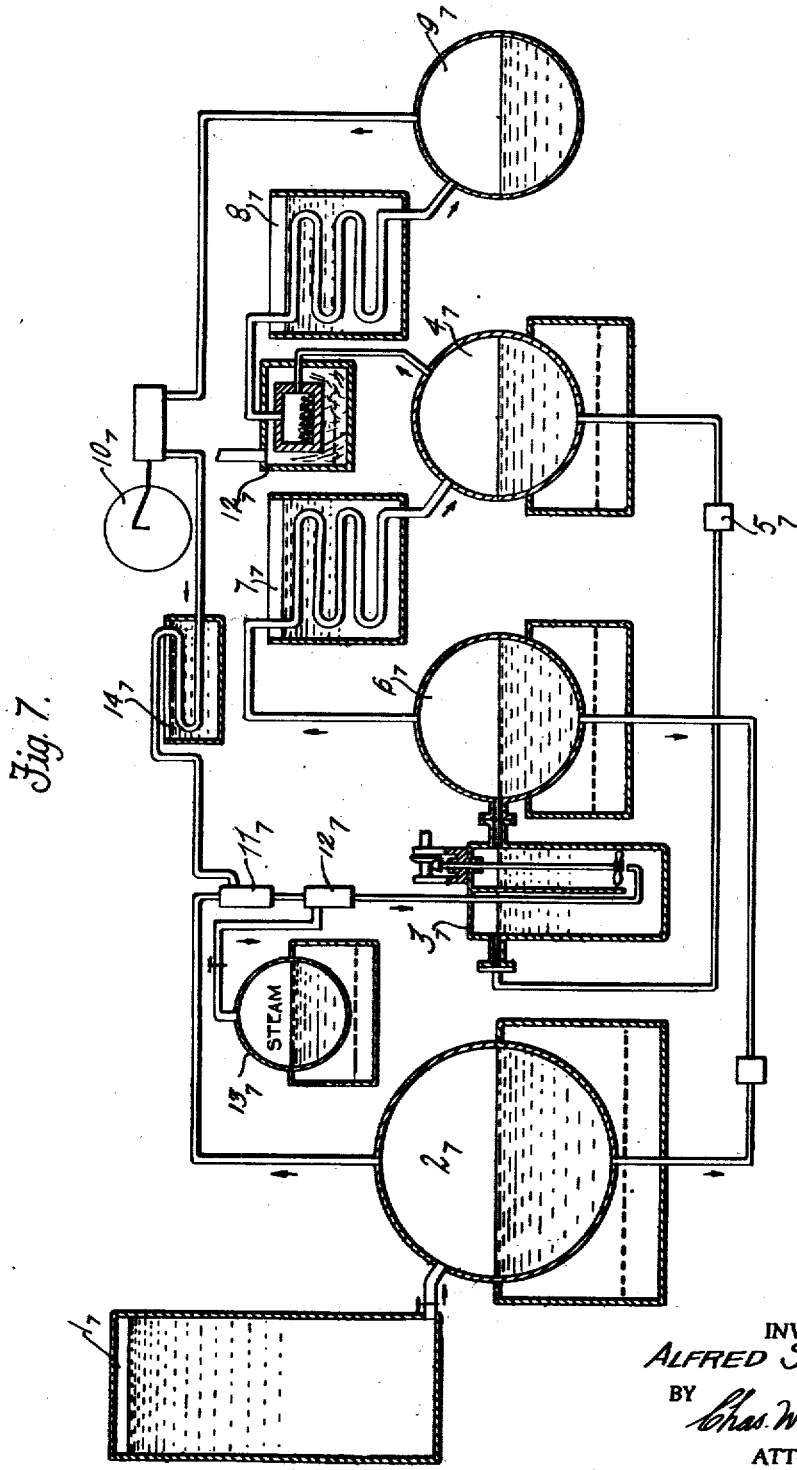

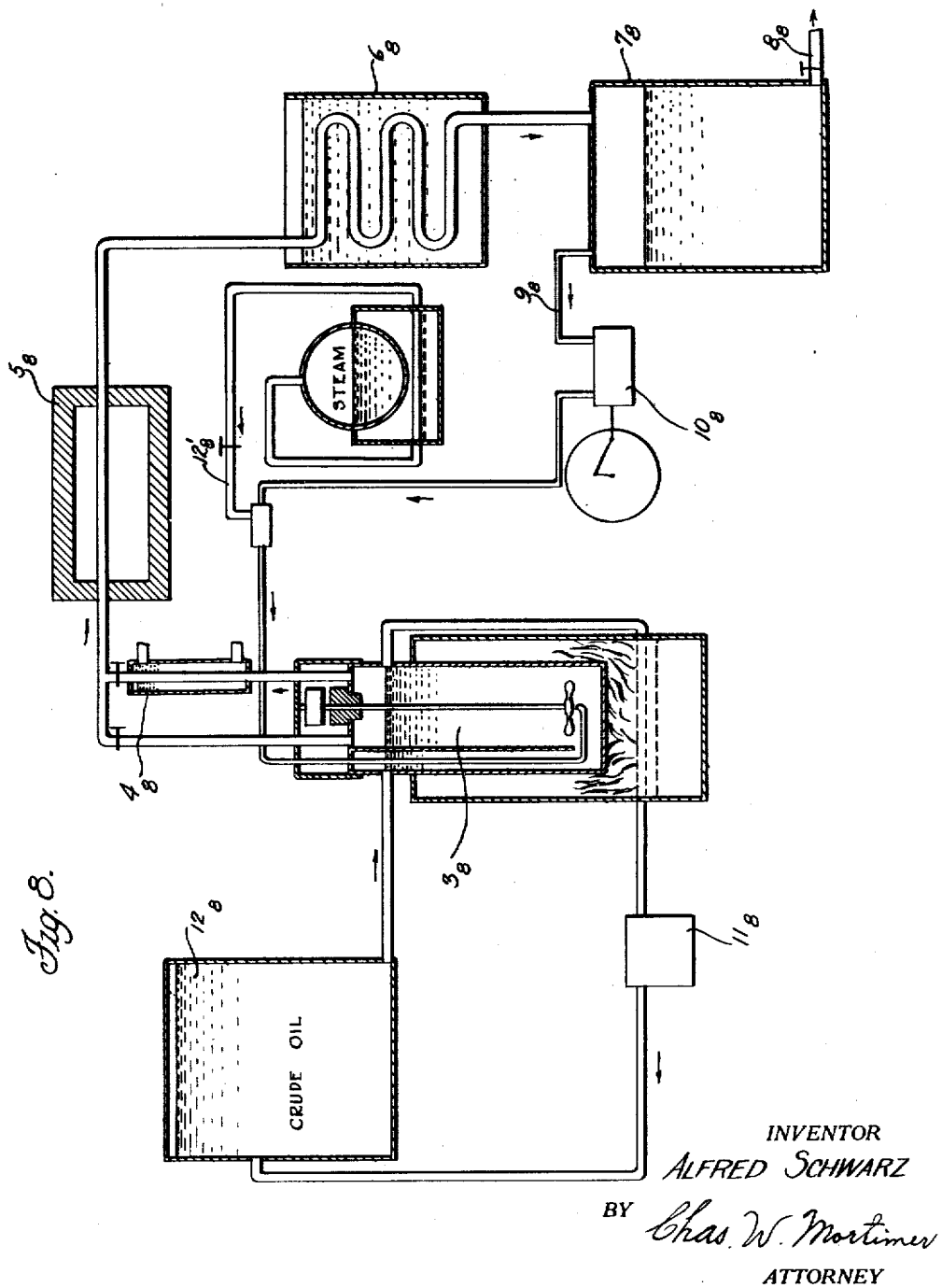

June 12, 1923.
A. SCHWARZ
PROCESS OF TREATING HYDROCARBONS
Filed Feb. 13, 1923    8 Sheets-Sheet 8
1,458,443
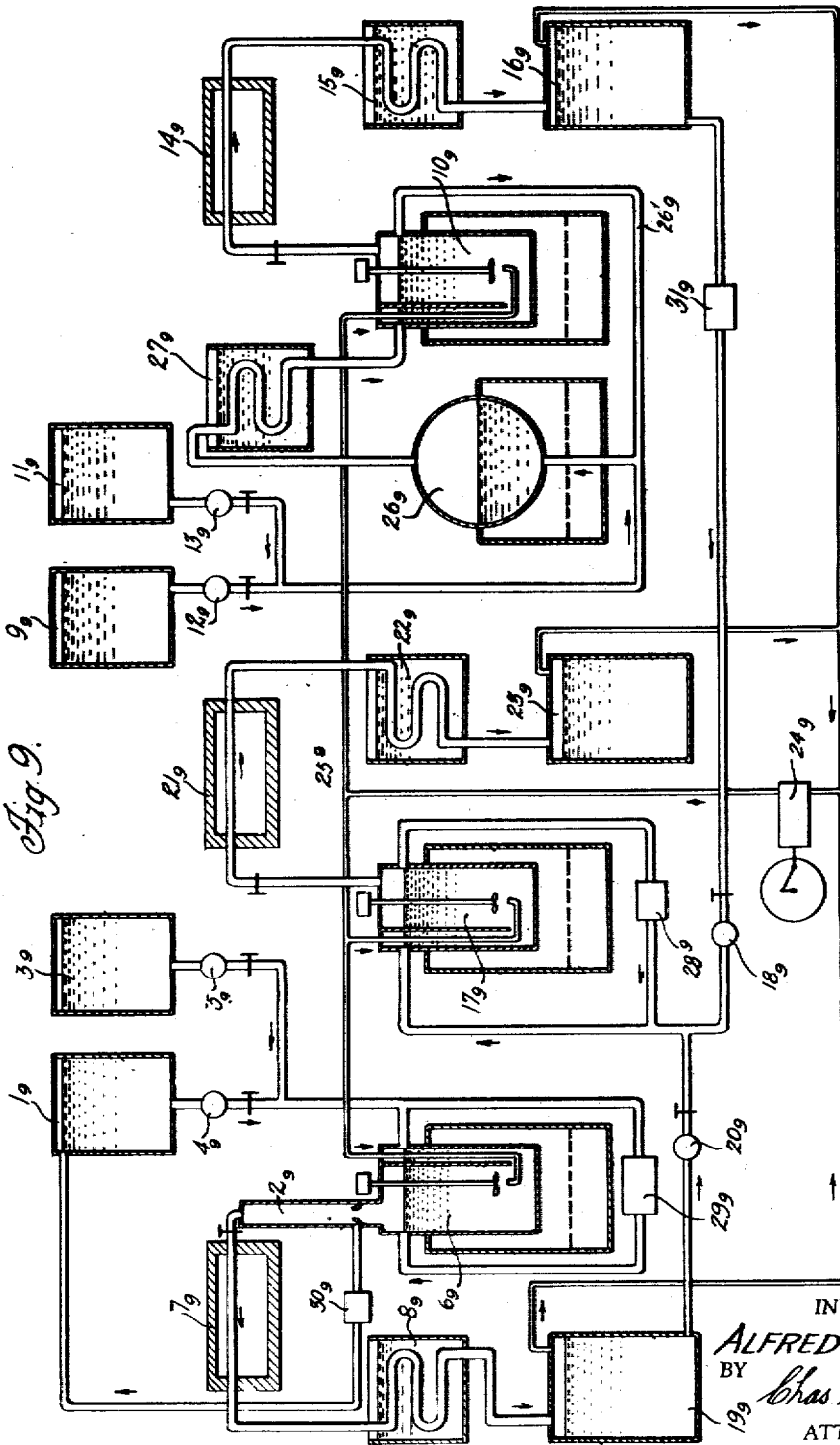
INVENTOR
ALFRED SCHWARZ
BY
Chas. W. Mortimer
ATTORNEY Patented June 12, 1923.

1,458,443

UNITED STATES PATENT OFFICE.

ALFRED SCHWARZ, OF MONTCLAIR, NEW JERSEY, ASSIGNOR TO PETROLEUM SAND PRODUCTS CORPORATION, A CORPORATION OF DELAWARE.

PROCESS OF TREATING HYDROCARBONS.

Application filed February 13, 1923. Serial No. 618,758.

*To all whom it may concern:*

Be it known that I, ALFRED SCHWARZ, a citizen of no country, an inhabitant of the United States, residing at Montclair, New Jersey, have invented certain new and useful Improvements in the Processes of Treating Hydrocarbons, of which the following is a specification.

In the treatment of oils the purpose of treatment is manifold, and the products, of course, are accordingly different. As the crude oils occur they are conglomerations of substances which, for the different uses have to be segregated and changed into classes which will be adapted for their individual uses. We have at atmospheric conditions, gaseous hydrocarbons, liquid hydrocarbons and solid hydrocarbons. These may be further subdivided into those containing only carbon and hydrogen, those containing carbon, hydrogen and oxygen, and those which contain in addition other constituents such as nitrogen, etc.

It is sufficient for the purpose of this patent application, to discuss the main classes, particularly those first mentioned.

In the treatment of such hydrocarbons, we deal with two distinct basic treatments, namely, segregation of compounds already existing, and the formation and segregation of new compounds formed. Due to the complexity of the chemistry of carbon, treatments given hydrocarbons often result in the change of the composition of the compound, intentionally or unintentionally, when in reality only segregation is thought of. On the other hand when changes are intended, new formations of compounds are often accomplished, either favorable or unfavorable to the result intended, and oft times such transformations are not recognized by the operator or chemist.

One of the objects of this invention is to afford means of control of such a segregation and reaction during treatment.

Other purposes of this invention are to produce an arbitrarily selected product of a given composition with predetermined boiling point, gravity, and other properties. In order to obtain such a product, compounds of great complexity and of varying properties must be combined and recombined chemically and finally separated from the mass of material employed.

For the purpose of explaining this invention, I will at present, confine myself to an operation having for its purpose a definite arbitrarily selected product, and while I describe the invention in such a manner, I do not wish to limit myself to any such particular operation, but I merely do this in view of the complexity of the subject, and to give a specific illustration of the invention.

It is to be understood that I may make by the process, a number of hydrocarbons; for example, those of the paraffine series, those of the benzol series, those of the fatty acid series, and many others.

Assume, for example, that a gasoline or motor fuel is to be produced from a fuel oil which had been previously distilled for its gasoline content, and therefore contains no further appreciable quantity of motor fuel available by further distillation by ordinary methods. Upon examination of this oil we find that there is ample hydrogen and carbon present in the oil to produce great quantities of additional gasoline, yet the recovery by distillation of gasoline in quantities sufficient for practical purposes, has ceased. It has been the practice heretofore to attempt to correct this condition by applying excessive heats and pressures. To a certain extent such operations have succeeded; but even here a point is reached where no further production of gasoline can be obtained because of purely mechanical reasons, namely, by increasing the pressure and temperature the operation becomes more and more dangerous, expensive and undesirable. When the orginal crude oil was distilled, a certain amount of gasoline compounds and also presumably certain intermediate products were present which freely united and formed more gasoline.

Such reactions between the intermediates is well known, for example, in gasoline production by the gas absorption process.

Since the naphtha cut was constantly removed from the oil under treatment, the intermediate products were used up and the operation came to a standstill. Had the conditions permitted the formation of new intermediates, new gasoline would be produced, but in view of the fact that in the practice of refining oil it has been found that with more heat and pressure more gasoline could be obtained, the natural tendency was to apply more and more of both until the limit was reached.

Pressure constitutes in the old art a means of retaining low boiling point compounds in contact with high boiling point compounds for a brief period. Instead of this mode of operation I agitate sufficiently to emulsify the vapors of lower boiling point compounds into higher boiling point compounds. This may be done with or without pressure. Pressure may be used, however, for heat expulsion or removal, as in the case of two gases capable of combining to form a third product by being compressed together.

Most oils now discarded and used as fuel oil still contain abundant quantities of hydrogen and carbon to produce more gasoline.

It is necessary, for the formation of chemical compounds, that the equilibrium between the reagents be not reached until the new compound is formed, and the reagent which caused the state of non-equilibrium must be the one which is influencing the reaction in the direction of the desired product.

In the distillation of petroleum products, as is customary today, a so-called naphtha cut is first made and products thereby extracted are substantially all of the saturated hydrocarbon type of a boiling point within the range in which the naphtha distillation was carried on. This naphtha cut is thereafter subjected to redistillation and gasoline is extracted therefrom, while the heavy cuts from such a distillation are refined and sold as petroleum, gas-oil and similar oils. This means that the bulk of the saturated hydrocarbons of a boiling point range useful for further construction of new compounds is removed from the crude oil and therefore a relatively increased amount of unsaturated hydrocarbons and an insufficient amount of saturated hydrocarbons in left behind incapable of further reacting because both heat equilibrium and saturation equilibrium has been reached.

This invention is based largely on the fact that hydrocarbon compounds change under heat treatment and it is believed that a definite proportioning of the saturated hydrocarbons to the unsaturated hydrocarbons favors the formation of certain desired compounds.

Reactions may take place through the addition of a saturated to an unsaturated compound, or by the decomposition of either an unsaturated or a saturated compound and if properly controlled an approximate composition can be obtained which is more favorable to the formation of a predetermined end compound than if such reactions were allowed to take place at random.

It is essential to maintain a non-equilibrium in the mass under treatment.

In speaking of equilibrium, it must be understood that there is a chemical and an energy equilibrium. The chemical equilibrium is reached when, at a certain temperature, all hydrocarbons have formed into groups or molecules commensurate with that particular temperature. If a chemical equilibrium exists, it can be disturbed by a temperature change but if a chemical non-equilibrium exists activity does not necessarily take place until the energy equilibrium is also disturbed synchronizing with the chemical non-equilibrium, thereby producing a certain given result. On the other hand, an energy non-equilibrium would not manifest itself until chemical conditions are such that reaction can take place, therefore, adding an unsaturated hydrocarbon to a saturated hydrocarbon will not produce the result unless temperatures are employed supporting the formation temperature of the new compound and vice versa. After a compound is formed it is usually stable within a range of temperatures, said range being often wide. Proper employment of this principle is important and the terms saturation and unsaturation and lighter and heavier hydrocarbons used in this specification are to be considered always relative and always in connection with temperature conditions since it is a well known fact that a saturated hydrocarbon ceases to exist as such when subjected to certain temperatures. The same, of course, holds good of unsaturated hydrocarbons.

The above illustrates that it is of course immaterial how the ratio of saturated hydrocarbons to unsaturated hydrocarbons is procured. It may be obtained by simply adding known saturated compounds to known unsaturated compounds or they may be procured by a treatment of the oil as part of the process, or in any other suitable manner.

In a complex mass of hydrocarbon compounds the reaction temperatures of each individual compound must necessarily be relatively different from those of other compounds, therefore, in order to cause reaction between some of them, temperatures must constantly be changed. In view of the fact that some compounds must be produced which are not to be used as finished product but as intermediates, and in view of the additional fact that the intermediate compounds may have a higher boiling point than the ultimate compound, the whole mass should first be passed through higher temperatures and then again through lower temperatures.

It follows therefore that neither constantly rising nor constantly lowering temperatures will produce the reactions in a complex aggregation of compounds but such a mixture should be passed through increasing and decreasing temperatures alternatively in order to give each compound an opportunity to find its mate.

Energy or heat equilibrium in a system is reached when a compound still in contact with another compound with which it may react, has no facilities to eject or absorb energy or heat as the case may be and as the arbitrarily selected end product would require. Any temperature change sufficient to upset that equilibrium and cause reaction between the available compounds is sufficient for the purposes at hand and as heretofore stated, such a temperature change may consist in lowering an existing temperature as well as raising it according to the results desired and if the temperature is raised when it should be lowered, different compounds from those desired will be obtained.

To illustrate the influence of heat upon the chemical reaction, I will give in the following two possibilities of reactions from the same combination. Adding amylene to pentane, we have $C_5H_{10}$ plus $C_5H_{12}$, we can get $C_{10}H_{22}$ decane. Amylene was an unsaturated hydrocarbon, pentane was a saturated hydrocarbon. The resulting product, decane, is a saturated hydrocarbon. In order to obtain this reaction, energy or heat had to be expelled. Taking the same two compounds, namely, amylene and pentane, and heating same, we will obtain from the amylene, ethylene $C_2H_4$ and propylene $C_3H_6$, while the pentane will break down into propylene $C_3H_6$ and ethane $C_2H_6$. Thus, as a result of this operation, we have obtained three unsaturated compounds and one saturated compound, while as a result of the previous operation we have obtained from one unsaturated and one saturated compound, one saturated compound.

In making gasoline we are aiming to make essentially saturated hydrocarbons. The proportion of saturated and unsaturated hydrocarbons in the raw material, therefore, is controlled by the composition of the raw material and its treatment. It follows, therefore, that in order to convert a certain amount of raw material into a finished product of a predetermined specification, the composition of saturated and unsaturated hydrocarbons in the raw material must be properly proportioned and a portion of the raw material may be subjected to a treatment of increasing temperatures while another portion may be subjected to decreasing temperatures after preliminary heating. Proper proportions of the result of each operation may then be combined and allowed to react with each other under predetermined conditions. It has been claimed heretofore that in passing hydrocarbon compounds of a random composition through ever increasing temperatures certain results can be obtained (gasoline can be made). The above examples, however, show that when for example gasoline is to be produced, care must be taken to separate and recool portions of the hydrocarbons formed before subjecting them to further reaction, otherwise, compounds entirely unsuitable for gasoline products would be obtained, namely—unsaturated hydrocarbons. For example, using the calculation as exemplified by the result of heating amylene and pentane which produced the compounds $C_2H_4$, $C_3H_6$ and $C_3H_6$ and $C_2H_6$, we can readily see that in order to produce gasoline, "ever increasing temperatures" would not do, but combining for example, all the products made by overheating after condensing out any already produced saturated hydrocarbons which might have been present (where this is a part of a complex reaction) and then cooling these gases rapidly to prevent formation of undesirable intermediates, we would obtain $C_{10}H_{22}$, a saturated hydrocarbon. It therefore follows that in order to obtain saturated hydrocarbons, (or distinct classes) it might become necessary to first condense out by slow condensation a portion of the saturated hydrocarbons and then by rapid cooling (compressing) condense out the balance of the hydrocarbon compound as saturated hydrocarbons. Any number of such combinations might be made.

The gist of the above is:

1. That there is ample hydrogen and carbon available in oils not now yielding gasoline. That because there may be an excess of carbon, some hydrogen will have to be added, or carbon removed, but that hydrogen cannot be added to all components of the very complex compound under the same set of conditions, and the present methods of distillation do not even make use of the available hydrogen.

2. Reaction, to form an arbitrarily selected compound, cannot be obtained from the basic elements available in a certain oil unless their already established union into compounds is first broken. It is not necessary or desirable to completely break down that union into the elements as long as its components can be rearranged into compounds which, under a series of sets of conditions, will recombine.

3. Temperature changes both upward and downward are necessary to produce an arbitrarily selected result. The composition of the raw materials will also greatly influence the resulting compounds.

4. Above all else, intimate contact must be maintained between all the reagents. A predetermined non-equilibrium can only be maintained if the speed of circulation is equal to the rate of reaction.

It is quite evident that reaction takes place mainly between the saturated and the unsaturated hydrocarbons because, for example, adding $CH_4$ to $C_2H_6$ we have three carbon and ten hydrogen atoms to dispose of. There is no such known combination as $C_3H_{10}$. We, therefore, have to either add hydrogen or carbon to make one or more new compounds. This would necessitate the supplying of either hydrogen or carbon from extraneous sources. However, since we aim mainly to convert available materials and not incorporate elements from foreign sources, we find that if we start with saturated hydrocarbons alone, we cannot produce higher or lower saturated compounds unless we form either unsaturated compounds as a by-product, or carbon and hydrogen as a by-product unless we first decompose as a step in the process said saturated hydrocarbons. It is quite different, however, if we use a saturated and an unsaturated hydrocarbon. For example, $CH_4$ plus $C_2H_4$ will produce the saturated hydrocarbon $C_3H_8$. It must be borne in mind that most crude oils are composed of saturated and unsaturated hydrocarbons and the aim is in making gasoline for example, to produce saturated hydrocarbons. It may be well argued that we can produce unsaturated from saturated and form new combinations. This is quite so, but the aim is to produce the new compounds economically.

In what is known as the distillation of gasoline from crude oil, an equilibrium or near equilibrium is not permissible for economical work and as demonstrated by the present practice of distillation, whenever an equilibrium is established, brute force (pressure) must be applied with consequent loss of energy. Even then, the operation comes to a standstill long before all of the available crude oil is converted. As a matter of fact, if means were to be devised to produce the most uneconomical method of conversion of crude oil into gasoline, nothing better could be done than to first extract from the crude oil the naphtha cut and then distill this naphtha out for gasoline, as is the present practice. First of all, by such a procedure, all saturated hydrocarbons are segregated from the unsaturated hydrocarbons and thereafter gasoline is again distilled from the heavier oils. This of course eliminates any reaction between the saturated and unsaturated hydrocarbons, whereas, if a constant solution in which a predetermined quantity of one class, namely: the saturated hydrocarbons were maintained, then at low temperatures and without pressure, hydrocarbons relatively higher in hydrogen, may constantly and continually be formed and may be allowed to pass off without forcing the process, and without the consequent loss.

In carrying out my invention it is essential to provide from some source the proper proportion of saturated and unsaturated hydrocarbons. This can be done in a number of ways. In the ordinary process of distillation so-called gas oil and also kerosene and similar saturated hydrocarbons are made. These should not be separated were the process properly conducted. To the contrary these products are needed for the uninterrupted production of saturated hydrocarbons. One of the ways of conducting my process is to prepare solutions of saturated and unsaturated hydrocarbons in proper proportion from such refinery products. Another way of preparing proper starting solutions for my process is to separate carbon from a portion of the hydrocarbons under treatment, thus producing the proportion of hydrogen and carbon needed for the proper reaction. A third way is to separate carbon compounds, high in carbon and low in hydrogen, and I will give in the following an example of how such an unequal condition can be established. A portion of the oil may be passed over a bed of an incandescent substance which may or may not react with the oil, for example:

Oil sprayed into a bed of incandescent coke will precipitate carbon and free high hydrogen containing compounds, either in gaseous or liquid form, which can then be used for conversion, as explained later. For another example, oil might be agitated with steam at proper temperatures, in some cases super heated steam, and compounds might be formed which carry off a considerable proportion of carbon and due to the incorporation of $H_2$ and $O$, the proportion of carbon used from the original oils is greater than the proportion of hydrogen. An approximate equation might be. $C_5H_{10}$ plus $2H_2O$ equals $C_5H_{10}O_2$ plus $2H_2$. And $2H_2$ plus $2C_5H_{10}$ equals $2C_5H_{12}$. In the original compound $C_5H_{10}$, we had a percentage by weight of the hydrocarbon of 85.6% carbon to 14.4% hydrogen. We then removed $C_5H_{10}O_2$ by forming a fatty acid first and then adding excess steam of a cooler temperature and thereby dissolved fatty acid. By permitting the water to settle from the oil, we make a separation leaving the compounds $C_5H_{12}$ in which the percentage of carbon is 83.3% and hydrogen 16.7%. This example, of course, is illustrative only, but it is nevertheless a fact that by treating unsaturated hydrocarbons regardless of whether saturated hydrocarbons are present or not, with superheated steam first and with cooler or wet steam afterwards, we remove a certain percentage of the hydrocarbons and thereby not only change the percentage of unsaturated to saturated, but add hydrogen to some of the compounds present, thereby changing the percentage of carbon and hydrogen in the original mass in accordance with the requirements of the process in question.

How this operation is carried on as a part of this process will be described later. The next requirement in carrying out my process is that a very intimate mixture of the reagents should be established and maintained. Various means may be employed. I prefer, however, mechanical agitation. In carrying out this step of the process I place into a receptacle of suitable dimensions an impeller and agitate the oil as it passes through the receptacle. Liquid oil is charged and gaseous hydrocarbons are supplied in accordance with the particular requirements. The discharge may be connected with an evaporator where evaporation takes place. It is understood that the oil entering the agitator may be heated to any desired degree and the agitator itself may be heated if necessary.

The process comprises providing a solution or combination of hydrocarbons capable of reacting with each other and maintaining that condition throughout the operation. It also comprises supplying hydrogen compounds with greater hydrogen content to compounds with lesser hydrogen content when it is intended to produce compounds of higher hydrogen content and maintaining that condition throughout the operation. The process further comprises maintaining intimate contact of all the hydrocarbons under treatment by agitation or similar means and passing the hydrocarbon during treatment through a series of temperatures, extracting the finished product and retreating the remainder. All hydrocarbons, whether liquid or gaseous, are maintained in intimate contact by agitation. When carbon is to be removed, it is either removed from a portion of the liquid under treatment and the remainder is recombined with other portions of the liquid under treatment in the proper proportion of hydrogen and carbon and saturated and unsaturated hydrocarbons, or else is removed from only a portion of the hydrocarbons in the presence of other hydrocarbons which are capable of immediately assimilating the hydrogen or hydrogen containing molecules thus made available.

My invention can also be carried out by agitating a body of oil and passing into the material under agitation superheated steam, for example, at 900° F. A certain portion of the oil is thereby converted into fatty acids or similar compounds. After the vapors are condensed, the oil may then be passed into another receptacle and treated with steam at 250° in a similar manner and thereafter the vapors from the second treatment are again condensed and in this operation the fatty acids will separate out in a hydrated form by settling. The oil is then passed to another agitator cell and treated according to my process heretofore described, the pretreatment with steam serving the purpose of carbon removal, and hydrogen enrichment of the oil. Another form of this same treatment may be conducted by first treating the oil in the agitator with superheated steam but passing the gases uncondensed through a heated chamber, in which case, the fatty acids will be destroyed and converted into carbon monoxide or dioxide gases, thereby removing a portion of the excess carbon, leaving the gases passing through enriched in hydrogen.

As carried on for the production of gasoline from heavy oils, the process appears to be based upon the reaction of a molecure with a smaller molecule, thereby producing from one small molecule and one larger molecule, a larger number of small molecules, partially for the purpose of producing intermediates products and partially for the purpose of producing finished product. Heat transfer so far as the molecules are concerned is facilitated when and where needed. The process can be carried on inversely to produce hydrocarbons lower in hydrogen and higher in carbon.

Secondary reaction such as addition of hydrogen and oxygen from water and the addition of other elements such as nitrogen and so forth, can be accomplished by following out the same general principles.

In the accompanying drawings there are illustrated arrangements of apparatus for carrying out the invention. In the drawings:

Fig. 1 is a plan view of a refinery.
Fig. 2 is an elevation of the same.
Fig. 3 is a sectional view of a mixing device.
Fig. 4 is a plan view of the same.
Fig. 5 is an illustration of a modified arrangement of apparatus.
Fig. 6 shows a second modification.
Fig. 6ª is a section through another form of mixer.
Fig. 7 shows a third modificaton.
Fig. 8 shows a fourth modification.
Fig. 9 shows another arrangement of apparatus for carrying out the invention.

In the drawings reference character 1 represents a series of crude storage tanks from which material such as crude oil is led to the heater or pipe still 2, where the oil is heated and from there a part or all of the oil passes by way of pump 45 and pipe 3 through the series of agitators 3. These agitators consist of a receptacle (more clearly shown in Figs. 3 and 4) in which an impeller is placed. These Figs. 3 and 4 illustrate my preferred form of this device. Any number of designs, however, may be employed to accomplish the same purpose. Reference character 1, in Fig. 3 represents the impeller which is driven by the bevel gears 2, and 3, from any suitable source of power. The shaft 4, carrying the impeller passes through stuffing box 5, and the oil is fed through the flange connection $6_3$, passing downward under the impeller $1_3$ and at this point pipe line $7_3$, which carries the gases, releases said gases and the rapid revolution of the impellor causes the incorporation of the gases into the oil in the shape of a gas and oil emulsion. It will be noted that the chambers in which the agitation takes place are rectangular which creates eddy currents aiding in the emulsification of the gas into the oil. Pipe line $7_3$ may also be used for the supply of other oils or middlings products, which are also known as unfinished products that are to be retreated, to the agitator or in addition to pipe line $7_3$ there may be inserted several pipe lines carrying besides gas, saturated and unsaturated hydrocarbons in predetermined quantities as the case may be.

Again referring to Fig. 1, it will be seen that pipe lines 4 supply oil from the tanks 5 which will be called middlings tanks. The middlings oil tanks 5 contain principally saturated hydrocarbons and these saturated hydrocarbons are metered into the agitators 3, where the mixture of saturated and unsaturated hydrocarbons is accomplished. I have found in practice that from 30% to 40% saturated hydrocarbons mixed with from 60% to 70% unsaturated hydrocarbons, or crude oil, give satisfactory results, even if such crude oil contains little or no original gasoline. The supply of saturated hydrocarbons however, may be cut down to 20% or thereabouts when the crude oil originally contains 15% or 20% saturated hydrocarbons, or the proportion of saturated hydrocarbons may be increased to any percentage.

Pipe lines 6 supply the gas to the agitators and said gas in these particular agitators is supplied preferably at atmospheric temperatures while the oil at that point was heated to about 500° F. The oil from these agitators 3, flow to the evaporating or pot still 7.

In the evaporating or pot still 7, the gasoline mixture is distilled and the vapors pass through the reflux condensers 8 which may be air cooled through the blower system 9. The vapors after refluxing the heavy hydrocarbons, pass through pipe line 10 and carbon removing furnace F into condensers 11 where the vapors are condensed and this forms a cooling chamber in which reaction between saturated and unsaturated hydrocarbons takes place. The condensate, together with the non-condensable gases, flow to tanks 12 from which the non-condensable gases are taken off through pipe line 13 and are passed through the compressor 14 and expansion system 15 of a well known type. After the gases leave the expansion system 15, they are quite cold and they are passed through the separating tank 16 where the gasoline products are removed through pipe lines 17 and are returned to the gasoline tanks 12, while the gases go on through pipe line 18 into the main gas line 19. The oil which has passed through the evaporator or pot still 7, unvaporized, goes through pipe line 20 into the tar trap 21 where the tar is separated and the oil passes back through pipe line 22 and part of the oil is shunted off through the temperature control apparatus 23. This is a simple condenser coil which is submerged in water of a predetermined temperature and which is calculated to maintain the temperature of the oil passing through it at a pre-determined level, say for example 300° F. The oil that is not shunted off goes through pipe line 24 back into the heater 2 and the oil which is shunted off goes through agitators 25 which may be similar to the agitators 3. Here gas taken from the gas main 19 is added and emulsified with the oil and the oil passes on back to the heater 2 and through the heater in the manner previously described and this oil or emulsion passes on in the general circulation as previously described.

The gasoline or naphtha cut extracted in tanks 12 passes through pipe line 26 into the rerun still 27 which is practically a duplicate system of the crude distillation system previously described, having, however, only one agitator 28. Gas from the main gas line 19 is taken in the agitator 28 to unite with some of the unsaturated hydro-carbons remaining in the gasoline. The bottoms from this still 27 pass on through pipe line 29 into the tar trap 30 and the light oils from this system pass on through pipe line 31 into tanks 5 and from the tanks 5 the middlings oil is entered into agitators 3 as previously described. The heavy oils from tar trap 21 go to storage tanks 44 and thence to the carbon removing furnace 32. Here the oil is heated under the exclusion of air to 700° F. and all the remaining hydrocarbon vapors are driven off and after passing condenser 40 and gas separator 41, pass through compressor system 33 into agitators 34 which may receive crude oil from a storage tank 35. The gases absorbed in the oil in agitators 34 pass with the oil through pipe 42 into tanks 5 while the gases which are not absorbed are separated in the separator 36 and pass on to the main gas line 19. The gasoline produced by still 27 goes through carbon removing furnace F' and condenser 43 to the separating tanks 37 and from there through the acid agitator 38 and to the storage tanks 39.

With a system of the sort above described, I have converted in a single operation, that is in one single circuit through the crude oil still, a mixture of 40% of saturated hydrocarbons of a boiling point range of from 436° to 600° with 60% of a fuel oil (which had been previously cracked in a Burton still) into synthetic crude containing 38% gasoline, said gasoline having a boiling point range of from 140° F. to 436° F. and the synthetic crude contains also additional saturated hydrocarbons to a total extent, including gasoline, of 80% of the original oil treated. This synthetic crude was distilled and yielded 38% gasoline boiling point range material and 30% kerosene boiling point range material and 12% gas oil boiling point range material.

In the arrangement of the apparatus illustrated in Fig. 5 for carrying out my invention, reference character $1_5$ represents an oil storage tank from which the oil flows into a still $2_5$. The vapors from this still are conducted to the agitator $3_5$ in which there is a saturated hydrocarbon coming from still $4_5$ through pump $5_5$ and through the temperature regulator $12_5$. The oil out of agitator $3_5$ flows into evaporator $6_5$. Here the oil mixture is evaporated and the vapor from it passes through condenser $7_5$ into another still $4_5$ and is again evaporated and from there the vapors pass through condenser $8_5$ into gas separator $9_5$ and from here the gases pass through compressor $10_5$, through injector $11_5$ and back into the agitator $3_5$. Steam may be admitted at $12_5$ from the steam boiler $13_5$.

In operating this system I charge in tank $1_5$ crude oil or fuel oil for example, and pass the same into still $2_5$. Here all the oil is evaporated to coke at whatever temperature is required, for example 900° F. The vapors pass through the agitator which has oil coming from still $4_5$ which is a saturated hydrocarbon, passing in at a temperature of about 200° F. The joint mixture in agitator $3_5$ is heated by the vapors coming from still $2_5$ again to about 500° F. and flow into still $6_5$ where the temperature is maintained between 500° and 600° F. through the firebox underneath the still. The vapors from still $6_5$ flow through condenser $7_5$ into another still $4_5$ where the gasoline is distilled off and the residual oil which is a saturated hydrocarbon passes back into agitator $3_5$ at a temperature much lower than the vapors. The gasoline goes through condenser $8_5$ into separating tank $9_5$ from which the uncondensed gases are passed through cooler $14_5$ into agitator $3_5$ for further evaporation, and, if desired, steam may be admitted from the boiler $13_5$ at the same time. In this manner I use crude or fuel oil which contains a predominating amount of unsaturated hydrocarbons, together with the residual distillate from still $4_5$ which is a saturated hydrocarbon, passing same through the agitator $3_5$ and carry on the conversion process the same as described in other parts of this specification, and produce gasoline or motor fuel from the same.

Another arrangement of apparatus for carrying out my invention is illustrated in Fig. 6. $1_6$ represents a still in which is charged crude or fuel oil, or similar type of high boiling point oils. This still may be heated to any desired temperature, for example 800° F. $2_6$ represents another still containing lower boiling point hydrocarbons, for example gas oil or kerosene. The oil in still $1_6$ is principally unsaturated hydrocarbons, while the oil in still $2_6$ is principally saturated hydrocarbons. Both oils are vaporized by boiling and pass through the mixing chamber $3_6$ into the condenser $4_6$ and from there into the separator tank $5_6$. Gases from $5_6$ pass through the compressor $6_6$ and are returned into the mixing chamber $3_6$ where they are again recombined with new oil vapors coming from stills $1_6$ and $2_6$. Fresh oil may be supplied to the still $2_6$ from the tank $7_7$, the circulation being maintained by means of the pump $8_7$.

Fig. $6^a$ shows a form of mixing chamber $3_6$. Any design of a mixer, however, may be used. In the apparatus shown in Fig. 6 the reaction takes place largely in the condenser $4_6$ or at least during the period when the two vapors are mixed and gradually cooled. It is immaterial to the process whether the vapors get their reaction temperature during the period downward from heating to cooling, or upward from hot to cold, as long as they are passed through a series of heat conditions in a thorough mixture of properly proportioned raw materials and, at one stage or another, are subjected to the proper temperature conditions. It is, of course, understood that this system the same as all other systems, can be elaborated upon by subdividing the one large step illustrated in Fig. 6 into a series of smaller steps if so desired.

It is to be understood that the system illustrated in Fig. 6 may be conducted as a batch process. In order to obtain the necessary hydrogen to reach the desired gravity and boiling points of the end product, it is necessary to continue the operation until in still $1_6$ either heavy tar or coke is formed. In other words, until in still $1_6$ a sufficient amount of carbon is extracted to provide a proper hydrogen balance. It should be noted also that the vapors from still $2_6$ are constantly circulated and this is done in order to provide all classes of intermediates to contact with each other. When gravity and boiling points are reached then the liquor may be drawn off from condenser $4_6$ directly to a storage tank and new batches may be charged into the stills $1_6$ and $2_6$.

Another arrangement of apparatus for carrying out my invention is illustrated in Fig. 7 of the drawings. $1_7$ is a tank containing fuel oil. $2_7$ is a still containing fuel oil which is mostly composed of unsaturated hydrocarbons. The vapors from this still may be passed with or without cooling through the injector $11_7$ into the agitator $3_7$. This agitator $3_7$ is supplied with oil coming from still $4_7$ which contains substantially saturated hydrocarbons and agitators $3_7$ acts as a mixer of the liquids fed from still $2_7$ and still $4_7$. Still $4_7$ may be substituted by a storage tank containing the oil, or the saturated hydrocarbon may be supplied from any suitable source at any desired temperature. The vapors from still $2_7$ mix with the oil supplied to agitator $3_7$ and, if desired, agitator $3_7$ may be heated to any desired degree. The heated oil is passed from agitator $3_7$ into still $6_7$ where evaporation takes place and passes from still $6_7$ into condenser $7_7$, from there into still $4_7$, and the oils are again evaporated, the heavy portions passing back as previously described into agitator $3^7$, while the vapor portions pass through a carbon stripping furnace $12_7$. Here the gases are partially stripped of carbon sufficient to raise their hydrogen content relative to their carbon content. The gases are then passed on through condenser $8_7$ into storage tank $9_7$ where any uncondensed gases may be separated from the condensate and the gases passed through the pump $10_7$ and cooler $14_7$ into injector $11_7$ where they pass through the circuit and are thus caused to react with hydrocarbons adjacent in physical and chemical qualities. Steam may be admitted from the boiler $13_7$ to the system at $12_7$. It is, of course, understood that any apparatus may be employed to carry out this system. It may be either a batch apparatus such as is described in the drawing, or a continuous method may be developed where gases are obtained from one system and oils from another system, or gases may be even employed from any source, such as natural gas, water gas and similar gases which may be employed to enrich the hydrocarbons.

Fig. 8 illustrates a form of my invention whereby the oil is evaporated in the agitator proper. As may be seen in this view, $3_8$ is the agitator, $4_8$ is a reflux condenser attached to the agitator. The vapors from the agitator $3_8$ pass through the reflux condenser $4_8$ and into the tubes of the furnace $5_8$ where the vapors are heated to approximately 1000° F. and carbon is removed. The vapors then pass through condenser $6_8$ into the separating tank $7_8$, there the liquid is drawn off through pipe $8_8$ while the gas is taken off through pipe line $9_8$ and returned to the agitator through pump $10_8$. The oil in the agitator is circulated by the pump $11_8$, through tank $12_8$ in which the mixture to be treated is supplied as needed. Steam may be admitted at $12'_8$.

Fig. 9 illustrates a combination or number of systems composed in accordance with my invention. Two of the systems produce an intermediate product while one of them produces, from these intermediate products, a final product. $1_9$ represents a feed tank containing crude oil which also receives the reflux oil from the reflux condenser $2_9$ through pump $30_9$. $3_9$ represents a feed tank containing a saturated hydrocarbon. $4_9$ and $5_9$ are meters designed to meter the oil in predetermined proportions to the agitator $6_9$, from which the vapors through the reflux condenser $2_9$ pass through the carbon removing furnace $7_9$ into the condenser $8_9$. $9_9$ represents another feed tank which feeds agitator $10_9$. $11_9$ represents a feed tank feeding the saturated hydrocarbons which are again metered by meters $12_9$ and $13_9$. The gases from agitator $10_9$ are passed through the carbon removing furnace $14_9$ without refluxing, and passed to the condenser $15_9$ and from there to the tank $16_9$ which acts as a feed tank to agitator $17_9$, the material being pumped through the pump $31_9$ and metered by the meter $18_9$.

Tank $19_9$ receives the product of condenser $8_9$ and this product is metered through the meter $20_9$, into the agitator $17_9$ and the vapors from this agitator $17_9$ pass, without refluxing, through the carbon removing furnace $21_9$ into condenser $22_9$ and are drained from there into receiving tank $23_9$ which contains the finished product. The gases from $19_9$, $23_9$, $16_9$ go to compressor $24_9$ and from there are distributed by pipe line $25_9$ to each of the three agitators $6_9$, $17_9$, $10_9$. The still $26_9$ is connected in series by the pipe $26'_9$ with the agitator $10_9$ and vapors from this still $26_9$ pass through condenser $27_9$ back into the agitator $10_9$. The reflux of the vapors from still $26_9$ into agitator $10_9$ through the condenser $27_9$, establishes the circulation of oil in this agitator while the oil in agitator $17_9$ is circulated by pump $28_9$, and the oil in agitator $6_9$ is circulated by pump $29_9$. The operation of this system will be explained as follows:

Two different classes of crude materials are fed through the two preliminary systems, producing intermediates, which are finally worked off in the final system represented by agitator $17_9$ into a finished product, all in accordance with my process hereinbefore described. Carbon is extracted at the carbon removing furnaces $7_9$, $21_9$ and $14_9$ from the vapors, and at $26_9$ from the oils. Where carbon is removed in the vapor phase, it is deposited in the carbon tubes, while when it is removed in the still $26_9$, it may be drawn off as tar in the usual manner, or removed as carbon, an operation which is well known to those skilled in the art.

In operating the impellers or stirrers for the agitators as shown in the several views, it is preferable to drive them at high speeds so as to produce vigorous agitation in order that the bubbles of gases or vapors rising through the oil will be broken up into an exceedingly large number of very fine bubbles which will slowly rise to the top and escape, thereby affording a much longer time of contact and a much greater surface of contact between the gases or vapors and the liquid oil than would be the case if the bubbles were simply permitted to rise during the ebullition. Agitation sufficient to incorporate about 15% or more by volume of vapors in the oil have been found to give satisfactory results. It is to be understood that this vigorous stirring may be produced in other ways well known in the art than by means of a paddle.

While I prefer to remove carbon in the form of carbon, it is within the scope of my invention to remove the carbon in the form of tar and I may carry on the operation as illustrated, for instance in Fig. 7 and Fig. 6. Instead of distilling to carbon in one of the stills handling the crude or heavy oil, I may distill only to tar in these stills and obtain qualitatively the same results, but of course, in that case I will not obtain the full hydrogen content of the oil into the motor fuel product but a portion will be carried off in the tar.

Without intending to commit myself to any particular theory to account for the results that have been obtained, I may say that the results have led me to believe that in a series of hydrocarbons ranging say from asphalt to gas, when heat is applied the hydrocarbons of lower range tend to combine with those of a higher range or series, which in turn tries to combine with hydrocarbons of the next higher series and so on, provided the proper proportions of saturated and unsaturated hydrocarbons exist at each step. Therefore, it is to be expected that hydrogen must be furnished which can be done, for example, by supplying $H_2O$ so that oxygen combines with carbon and leaves hydrogen available, or an equivalent result can be accomplished by removing carbon from the hydrocarbons in any other convenient way, as by a carbon furnace for instance, thereby leaving a proportionately higher percentage of hydrogen in the hydrocarbon which is available for combination with the lower range or series of hydrocarbons.

One great advantage of my process is when I distill oil during agitation, the distillation acts differently from ordinary distillation inasmuch as fractionation takes place only to a very limited extent. As a matter of fact, oils of widely different boiling points distill off at the same time and at a much lower temperature than would otherwise be required and the distillate is of a complex character. When I charge the vapors obtained by such a distillation into the furnace which I have described as a carbon removing furnace, these vapors are composed of a complex mixture of saturated and unsaturated hydrocarbons and while I do not limit myself to charging the carbon removing furnace with such a complex mixture, yet I find it very advantageous in many cases, particularly in the case of production of motor fuel when numerous types of hydrocarbons are intimately mixed during the period when carbon is discharged from the various molecules, on account of the fact that the fractions of the molecules broken up in the carbon removing furnace will find a multiplicity of opportunities to recombine during condensation into molecules that are in the range of the desired end products. Carbon when segregated from hydrocarbons causes often mechanical difficulties in clogging the apparatus used. In my process, I combine hydrocarbons of a higher carbon content with those of a lower carbon content and correspondingly higher hydrogen content and distilling same under agitation, segregation of those carrying a higher hydrogen content is to a certain extent prevented, with the net result that when these vapors enter the carbon removing furnace, some of them travelling closer to the heated surfaces, discharge carbon leaving an excess of hydrogen available which is immediately assimilated by those travelling in cooler zones or more toward the center of the tubes employed, and upon leaving the carbon tube further reaction may take place during condensation. It is essential therefore that such hydrocarbons which have been disrupted and have available hydrogen, shall be given an opportunity to combine with those suitable to make with them compounds in the range desired. As a mechanical requirement, it is preferable that the carbon should be removed from the tubes, if possible automatically, and should not adhere to the tubes and clog the apparatus. It is therefore desirable not to have the carbon discharged from the oils in relatively large quantities at any one time at any one place. If hydrocarbons of the heavier type were to be charged in the carbon tube, great quantities of carbon would be deposited and therefore incrustations in the tubes would rapidly accumulate and render the apparatus useless. In my process, however, due to the fact that I have present in the agitator still an abundance of light hydrocarbons, the exchange of hydrogen due to heat absorption takes place in the liquid state so that heavy oil or tar is constantly absorbed by fresh quantities of light hydrocarbons and therefore when these vapors reach the carbon removing furnace only relatively small percentages of carbon are eliminated at any one time and place. This carbon is then so finely divided that it remains suspended in the vapors and is carried out with the liquid oils and can be strained off or extracted by centrifugal driers or in any other suitable manner from the liquid, thus making the process continuous and easily operative in a simple apparatus. It must be understood that the carbon is discharged in just as great a quantity ultimately but due to the intercirculation of light hydrocarbons with heavy hydrocarbons, liquid conditions are maintained in the agitator and only light vapors have to be treated in the carbon removing chamber, inter-reaction of the cracked molecules with unsaturated or saturated molecules in a nascent condition is favored when the fractured molecule after passing through the heat treatment which caused its fracture, is allowed to cool in contact with other molecules of similar nascent condition. It must be borne in mind that whenever two smaller molecules are combined into a larger one, this must go on at decreasing temperatures while the disruption of a larger molecule into smaller ones goes on in rising temperatures, and it is for this reason that it is very important that mates for the fractured molecules be provided when and where needed. The importance of this may be seen when it is considered that some of the products obtained by fracturing molecules may be uncondensable or fixed gases, but in meeting immediately upon leaving the heated zones (and before their state of nascency ceases) another molecule suitable for combination, it will combine and will form a condensable gas which will later on form a useful compound in the formation of gasoline or similar product.

While I believe that it is necessary to have given proportions of saturated and unsaturated hydrocarbons, I do not limit myself to any particular degree of saturation but I carry out my process through the medium of constantly diluting heavy fractions with lighter fractions, thereby eliminating the formation of tars and I believe that during such dilution, heating and distilling, reactions take place incorporating the bigger molecules of tarry substances with the smaller molecules of the lighter oils.

Hydrocarbons on account of the ability of carbon to link to carbon, act as reagents toward each other. A hydrocarbon rich in hydrogen acts as a disturbing factor toward the equilibrium of a hydrocarbon low in hydrogen provided the flow of energy is established, therefore, upon heating a hydrocarbon rich in hydrogen with a hydrocarbon poor in hydrogen, a tendency to establish equilibrium will soon destroy the individual existence of both and new compounds will be formed just the same as a hydrocarbon when added to oxygen at the proper temperature will establish an outward flow of energy through combustion, emitting heat. Complete non-equilibrium constitutes the most favorable condition toward maximum reaction. The nearer the equilibrium is established, the less the reaction. In the prior art of distillation of oil, the creation of non-equilibrium was not only not favored, but the establishment of equilibrium was favored. When oil was distilled in the old art, the saturated hydrocarbons were segregated and those not converted into the ultimate product were not returned and in order to maintain non-equilibrium, this should have been done, therefore, equilibrium took place much earlier than should have been permitted and one of the objects of my invention is a process in which equilibrium is never reached and is prevented by constant additions of hydrocarbons richer in hydrogen than those remaining. By continuous change of temperature at different portions of the process so calculated as to maintain flow of energy (heat of formation or whatever it may be called) and the establishment of chemical non-equilibrium creates a condition in which the oil can assimilate the energy supplied which wou'd otherwise be wasted. In forming compounds higher in carbon than in hydrogen the inverse of what has been said above holds good.

It may be mentioned as a specific example of carrying out the invention, that I have used 70% of fuel oil which had been previously distilled in a pressure still and had no further content of gasoline available by ordinary methods and added to this 30% of ordinary commercial kerosene, placed same into an agitator provided with an impeller driven at high speed and a reflux condenser, and heated the oil during agitation to 250° F. The agitator was connected through the reflux condenser to a series of pipes extending into a furnace heated to 1200° F. The gases therefrom were passed to an ordinary pipe condenser and this condenser was connected to a separating tank. The gases or non-condensable vapors from this separating tank were blown by means of a low pressure blower under the impeller in the agitator tank. The arrangement of the apparatus being shown in Fig. 8 of the accompanying drawings.

In distilling this oil in this manner I obtained a distillate which was placed again into an ordinary still and upon fractionation I obtained therefrom 26% in the form of motor fuel or gasoline with an initial boiling point of 140° F. and an end point of 357° F. The residue from this distillation was again placed in the agitator and yielded again upon the same treatment, approximately the same percentage of motor fuel. This process was repeated until insufficient quantity was available to fill the agitator and maintain agitation. Thereafter, this residue which had still about the same specific gravity as the original oil mixture was added to a new charge of the fuel oil and kerosene mixture and was treated in the same way. This was repeated several times, adding charges of about 70% fuel oil and 30% kerosene as needed, and at no time was there removed any tar from the system, although gasoline was repeatedly removed. The carbon, however, was removed from the carbon furnace whenever necessary. Many other investigations with different oils yielded equally surprising results.

As a further specific illustration of this invention it may be mentioned that about 20% to 40% of a saturated hydrocarbon may be mixed with about 80% to 60% of an unsaturated hydrocarbon, the mixture subjected to this treatment and large yields of lighter or lower boiling point hydrocarbons may be thereby obtained.

When I say, maintaining a constant solution, I mean that, in contrast to the prior practice in distilling oils to constantly remove fractions of said oils thereby degenerating the mother liquor, I have found when I remove only the end product, namely the product which I wish to form in the process, and return or procure from other sources, intermediates, and add the same to the mother liquor thereby maintaining substantially the same composition of the mother liquor as originally started, I will form more of the end product and avoid degeneration of the mother liquor. As a practical illustration of this I have found that when as is done in ordinary refining practice, a naphtha cut is made comprising usually gasoline and kerosene and the gasoline is distilled off from said naphtha cut, the kerosene is usually retained and disposed of as such, whereas, if the kerosene were added back to the mother liquor it would act as an intermediate product and by making another naphtha cut it will again yield additional gasoline. In order to constantly produce this result I have provided what I call a carbon furnace. The carbon furnace removes carbon and thereby produces not only more gasoline, but more kerosene. I then distill off the gasoline and return the additional quantities of kerosene so formed to the mother liquor, or I may add also more crude oil, etc., thus maintaining what I consider a substantially constant solution. While I consider it essential that some of the carbon be removed from the later distillates, in order to form light hydrocarbons which may combine upon cooling into gasoline compounds, yet in cases where large quantities of carbon are to be removed, I distill some of the heavy hydrocarbons to coke and combine the oils or distillates from this operation with other suitable portions of the oil, thus removing carbon in bulk.

It is, of course, understood that most crude oils, before distillation has started, contain the proper proportion of light oils and heavy oils, but in the customary methods of distillation this proportion is degenerated very early in the process and completely degenerated at the end of the process, when still great quantities of hydrogen and carbon are available for the production of motor fuel.

I propose to avoid such a degeneration by constantly forming lighter hydrocarbons in the carbon furnace or its equivalent and constantly adding such intermediates as are not considered end product back to the mass under distillation, thus maintaining constant condition.

I mean by the expression "gas-oil emulsion" or "vapor-oil emulsion", a minute subdivision of one of these substances in the other, and the aim is to approach a colloidal condition as near as possible.

I claim:

1. The process which comprises maintaining a substantialy constant mixture of heated saturated and unsaturated hydrocarbons in predetermined proportions, injecting a gaseous hydrocarbon, agitating sufficient to form a gas-oil emulsion, distilling off portions thereof, and decreasing the proportion of carbon to hydrogen in portions of the distillate, selectively removing predetermined compounds therefrom and returning the remainder for further treatment.

2. The process which comprises mixing and maintaining saturated and unsaturated hydrocarbons in predetermined proportions, injecting a gaseous hydrocarbon, forming a gas-oil emulsion, changing the temperature until reaction and volatilization takes place, removing the vapors, removing carbon from said vapors and introducing constituents of said vapors after carbon removal.

3. The process which comprises mixing liquid hydrocarbons relatively low in hydrogen with hydrocarbons relatively high in hydrogen, maintaining a substantially constant hydrogen content proportion, forming a vapor-oil emulsion, distilling, extracting carbon from the distillate and condensing.

4. The process which comprises mixing liquid hydrocarbons relatively low in hydrogen with hydrocarbons relatively high in hydrogen, maintaining a substantially constant hydrogen content proportion, agitating sufficient to form a vapor-oil emulsion, and distilling, extracting carbon from the distillate and condensing and returning condensate to the mixture.

5. The process of synthetically producing hydrocarbons of increased hydrogen content, which comprises heating a mixture of hydrocarbons containing a number of hydrocarbons whose molecules consecutively increase substantially in hydrogen content, maintaining the chemical composition of the mixture substantially constant, injecting a gaseous hydrocarbon, agitating sufficient to form a gas-oil emulsion, vaporizing the hydrocarbons of lowest boiling point, extracting carbon from said vapors condensing and returning a part of the condensate to the original vessel.

6. The process which comprises distilling hydrocarbon oils, raising the temperature of some of the vapors so formed sufficiently high to remove carbon, condensing said vapors and reheating the same under agitation sufficient to form vapor-oil emulsions and contacting them with said oils.

7. The process which comprises mixing light oils with heavy oils, in predetermined proportions, violently agitating in addition to commotion that results from distillation so as to form a vapor-oil emulsion and distilling same, extracting carbon from the distillate and condensing and returning condensate to the mixture.

8. The process which comprises mixing a light oil with heavy hydrocarbons, injecting a hydrocarbon gas, forming a gas-oil emulsion, distilling the mixture passing the distillate comprising the light fractions through heated zones, extracting carbon therefrom, condensing said distillate and fractionally distilling said distillate and using the heavier fractions therefrom for mixing with said heavy hydrocarbons.

9. The process which comprises combining predetermined quantities of hydrocarbons of different chemical series, heating said mixture while maintaining intimate mixing conditions by violent agitation in addition to commotion that results from distillation and sufficient to form a gas-oil emulsion, distilling off products and supplying additional quantities of said hydrocarbons.

10. The process which comprises supplying to a solution of hydrocarbons under heat treatment a constant excess of hydrogen through the agency of hydrogen-carrying materials which are capable of reaction maintaining intimate contact of the molecules by agitation sufficient to form a vapor-oil emulsion.

11. The process which comprises distilling oil of relatively low hydrogen content and injecting the vapors so formed into a bath of hydrocarbons relatively high in hydrogen agitating the mixture sufficient to form a vapor-oil emulsion and distilling off products of reaction.

12. The process of synthetically producing hydrocarbon compounds which comprises maintaining a substantially chemically constant solution of hydrocarbons so proportioned that the hydrogen is in excess and varying the temperature while distilling under violent agitation sufficient to form a vapor-oil emulsion.

13. The process which comprises mixing about two to four parts by weight of saturated hydrocarbons with about eight to six parts of unsaturated hydrocarbons and changing the temperature until reaction takes place, injecting a hydrocarbon gas, agitating sufficient to form a gas-oil emulsion, distilling off products and maintaining the proportions substantially the same as above mentioned.

14. The process which comprises mixing about two to four parts by weight of saturated liquid hydrocarbons with eight to six parts of unsaturated liquid hydrocarbons, introducing a gaseous hydrocarbon, emulsifying the mixture and changing the temperature until reaction takes place.

15. The process which comprises agitating liquid hydrocarbon in the presence of gaseous hydrocarbons, thereby forming a gas-oil emulsion and distilling said emulsion.

16. The process which comprises injecting a gaseous hydrocarbon into a liquid hydrocarbon, said liquid hydrocarbon being agitated to such a degree so as to form with the gaseous hydrocarbon a gas-oil emulsion and distilling said emulsion.

17. The process which comprises injecting a gaseous hydrocarbon into a liquid hydrocarbon, said liquid hydrocarbon being agitated to such a degree so as to form with the gaseous hydrocarbon a gas-oil emulsion, and distilling said emulsion and passing the vapors from said distillation through temperatures increased sufficient over the distillation temperature to cause reactions.

18. The process of producing motor fuel and similar light hydrocarbons which comprises distilling oils substantially to dryness, intimately mixing the distillate with hydrocarbon oils in proper proportions to cause reactions, injecting a hydrocarbon gas, agitating sufficient to form a gas-oil emulsion, distilling off the lighter fractions of the mixture, subjecting the vapors from said last mentioned distillation to the action of heat, thereby extracting carbon therefrom and condensing said vapors.

19. The process of producing motor fuel and similar light hydrocarbons which comprises distilling oils substantially to dryness, intimately mixing the distillate with other hydrocarbon oils in proper proportions to cause reactions, injecting a hydrocarbon gas, agitating sufficient to form a gas-oil emulsion, distilling off the lighter fractions of the mixture, subjecting the vapors from said last mentioned distillation to the action of heat, thereby extracting carbon therefrom, condensing said vapors redistilling the condensate, thereby removing the lighter fractions and returning the heavier fractions thereof to the mother liquor for further reaction.

20. The process which comprises distilling a solution of hydrocarbon oils, introducing into the solution a hydrocarbon high in hydrogen that will react with the solution being distilled, and preventing the formation of substantial amounts of fixed gases by agitation sufficient to form a gas-oil emulsion.

21. The process which comprises distilling a solution of hydrocarbon oils, removing carbon from the distillate, introducing into the solution a hydrocarbon high in hydrogen, said hydrocarbon being obtained by removing carbon from said distillate, and agitating the solution sufficient to form a gas-oil emulsion.

22. The process which comprises agitating and distilling a solution of hydrocarbon oils and maintaining the solution substantially constant during the distillation by introducing a hydrocarbon therein which has hydrogen in sufficient excess to prevent substantial degeneration of the solution during distillation, said agitation being sufficient to form a gas-oil emulsion.

23. The process of mixing and distilling two or more oils so proportioned in saturated and unsaturated hydrocarbons that there will be present saturated compounds for reaction with substantially all of the unsaturated compounds in the mixture which it is desired should react, injecting a hydrocarbon gas, and agitating sufficient to form a gas-oil emulsion.

24. The process which comprises mixing two or more hydrocarbons so proportioned in saturated and unsaturated hydrocarbons as to provide substantially each compound with another compound capable of reacting with the same, injecting a hydrocarbon gas, agitating sufficient to form a gas-oil emulsion, causing temperature change promote reactions, and maintaining substantially constant chemical condition by inflow of new compounds from separate sources.

25. The process which comprises destructively distilling heavy hydrocarbons, condensing the condensable portions of the vapors, forming a gas-oil emulsion containing uncondensable portions of the vapors, and distilling said emulsion.

26. The process which comprises destructively distilling heavy hydrocarbons, condensing the condensable portions of the vapors, forming a gas-oil emulsion containing uncondensable portions of the vapors, distilling said emulsion, cracking the vapors therefrom, condensing said vapors and returning the uncondensable portions thereof to said emulsion.

27. The process which comprises destructively distilling hydrocarbons predominatingly consisting of unsaturated hydrocarbons mixed with hydrocarbons predominatingly saturated, condensing the condensable portions of the vapors, forming a gas-oil emulsion containing uncondensable portions of the vapors distilling the emulsion, passing the vapors therefrom through a vapor-phase cracking operation, condensing said vapors and returning the uncondensable portions to be emulsified.

In testimony whereof, I have signed my name to this specification, this 12th day of February, 1923.

ALFRED SCHWARZ.